Dec. 5, 1939.  E. P. POLUSHKIN  2,182,236
MICROMETER GAUGE
Filed March 9, 1937  2 Sheets-Sheet 1
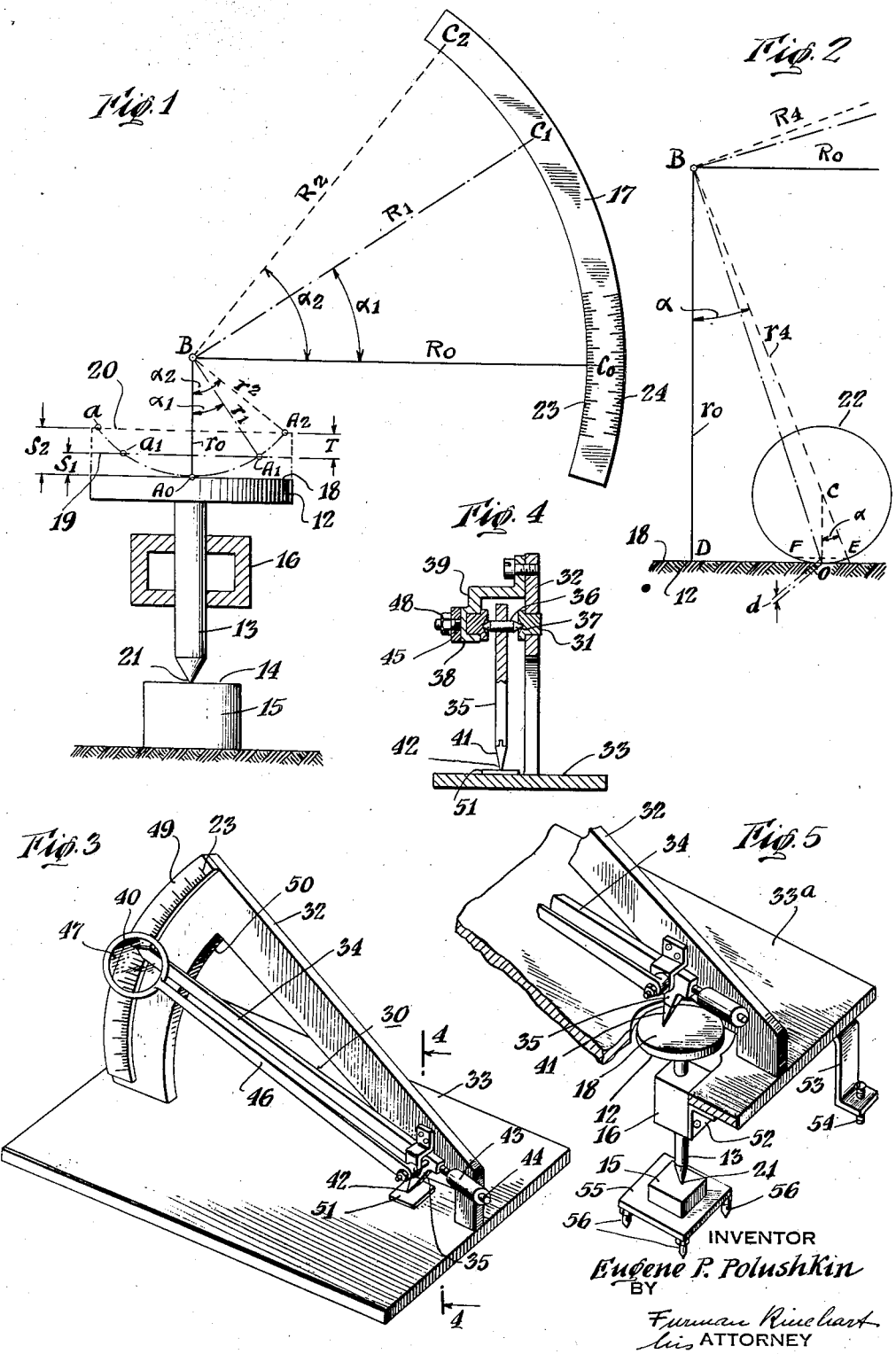
INVENTOR
Eugene P. Polushkin
BY
Furman Rinehart
his ATTORNEY Dec. 5, 1939.　　　　E. P. POLUSHKIN　　　　2,182,236
MICROMETER GAUGE
Filed March 9, 1937　　　2 Sheets-Sheet 2
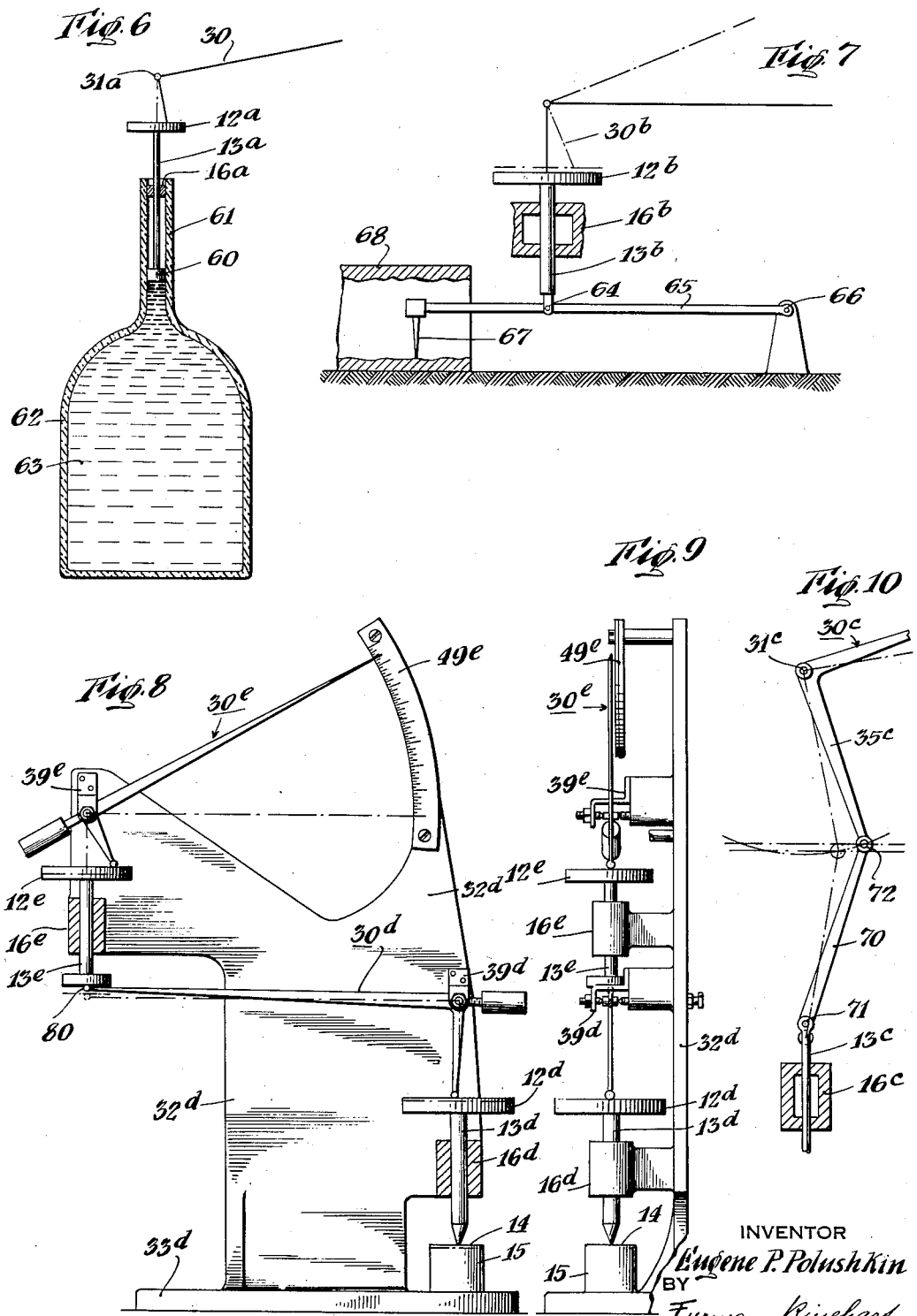
INVENTOR
Eugene P. Polushkin
BY
Furman Rinehart
his ATTORNEY Patented Dec. 5, 1939

2,182,236

UNITED STATES PATENT OFFICE 2,182,236

MICROMETER GAUGE

Eugene P. Polushkin, New York, N. Y.

Application March 9, 1937, Serial No. 129,775

5 Claims. (Cl. 33—169)

This invention relates to instruments and a method for making measurements of small order. More specifically the invention relates to apparatus for measuring very small translations of solid or fluid bodies and their expansion and contraction caused by heat or other physical or chemical agents.

The invention further relates to a method and apparatus for measuring the thickness of thin sheets, deposits and surface coatings such as formed by electro-deposited metals, paints, lacquers and the like; also for recording minute variations in the surface profile or mechanical deformations of small order.

Furthermore, the method and apparatus provided by the invention can be used in conjunction with thermal control and thermostatic devices, with liquid level and gas pressure indicators, with machines for testing mechanical properties of materials or directly with structural members to disclose the presence and magnitude of stresses. In fact, the invention lends itself admirably in the determination of delicate changes of position in practically all instances where translations of small order only are available for measurement.

In accordance with one of the features of the invention an angular lever with unequal sides or arms is mounted on a pivot. The free end of the shorter arm may lean against a hard and smooth plate mounted for vertical movement. When the plate is caused to move vertically upward it raises the end of this arm and thus increases the angle of the arm with the vertical. In case of downward movement of the plate, the end of the arm is lowered and the angle of inclination is decreased. At the same time the free end of the longer arm of the lever travels along an arcuate scale and indicates the angle of rotation in lineal measurement. As will be described in detail hereinafter, the angle of rotation is a certain function of the vertical displacement of the free end of the shorter arm. Or, to express this relationship in terms of geometry, an arc described by the longer arm on the scale is a certain function of the sagitta of an arc described by the shorter arm in its movement. For small angles the ratio between the arc and sagitta is very great, and for this reason, exceedingly small vertical translations of the free end of the shorter arm may be recorded on the scale as highly magnified arcs.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a diagrammatic illustration to facilitate description of some theoretical aspects of the invention;

Fig. 2 is a further diagrammatic illustration;

Fig. 3 is a view in perspective of one form of apparatus;

Fig. 4 is a view in cross section on line 4—4 of Fig. 3;

Fig. 5 is a partial view in perspective and partly broken away of a modified form of apparatus;

Fig. 6 is a view, partially diagrammatic, to illustrate the use of the invention to determine expansibility of liquids;

Fig. 7 is a view, partially diagrammatic, to illustrate a further modification;

Fig. 8 is a front view in elevation and partly in section of a modified form of apparatus having multiple levers;

Fig. 9 is a side view in elevation of the embodiment shown in Fig. 8; and

Fig. 10 is a view, partially diagrammatic, of a further modification.

To facilitate discussion of the modus operandi of the invention reference is directed to Fig. 1 which is primarily diagrammatic. The angular lever $A_0BC_0$ is represented by line $A_0B$ indicating its shorter side $r_0$, herein called "sliding arm"; $BC_0$ its longer side $R_0$ herein called "indicating arm"; the said lever being pivoted at B. The end $A_0$ of the sliding arm may contact the surface 18 of a smooth hard plate 12, herein called "contact plate" which may be fixed to a rod 13 which may in turn rest on the surface 14 of a test specimen 15. Rod 13 may be mounted for vertical sliding movement in a frame 16. Adjacent the free end of recording arm $R_0$ is positioned an arcuate scale plate 17. The scale is graduated or divided into small equal divisions 23 of suitable size.

Let it be assumed that $R_0$ and $r_0$ represent zero position of the lever $A_0BC_0$. $A_0B$ will be vertical and if $A_0BC_0$ is a right angle $R_0$ will assume a horizontal position.

Now let it be assumed that the surface 14 of the test specimen 15 is moved in a vertical direction until the surface 18 of the contact plate 12 takes the position of dot-dash 19. This position may be designated as the initial position. The lever $A_0BC_0$ if permitted to rest against the plate 12 will now take the position shown in dot-dash lines $A_1BC_1$. The angle $A_0BA_1$ is designated as initial angle of inclination $\alpha_1$. It will be observed that downward movement of the plate 12 from this position 19 will decrease the angle of inclination $\alpha$ between the short arm and the vertical or zero position, while an upward movement will increase the angle of inclination since the lever may be so weighted that the resulting components of force will cause the free end of the short or contact arm to move in an arc about pivot B and, at the same time, along the surface of the contact plate.

A mathematical relation between an elevation of the plate above the zero position and inclination angle may be expressed by formula $$s = r(1 - \cos \alpha) \quad \quad \quad (1)$$

where $s$ is the sagitta of an arc described by the contacting end of the short arm,
$r$ is the length of the short arm, and
$\alpha$ is the angle of inclination between the arm and the vertical $A_0B$.

This is a general formula applying to all possible positions of the short arm.

Since it has been assumed that the specimen 15 is adjusted to cause the surface 18 of the plate 12 to take the position at dot-dash line 19, the contact arm $A_0B$ will take the position $A_1B$ and the long arm will take the position $BC_1$. Applying the general formula specifically to these conditions we have $$s_1 = r_1(1 - \cos \alpha_1) \quad \quad \quad (2)$$

where $s_1$ is the sagitta of an arc $A_1A_0a_1$,
$r_1$ is the length of contact arm, and
$\alpha_1$ is the angle $A_1BA_0$.

It will be observed that the angle $C_0BC_1$ is equal to this initial angle of inclination $\alpha_1$. It may be read off of scale 23 on scale plate 17 in lineal or angular measurement as the long arm R and the scale may be of sufficient size for accurate reading. A scale 23 may be graduated for lineal measurement and a scale 24 may be graduated for angular measurement.

Now assume that the surface 18 of the contact plate 12 is elevated to position of the dotted line 20. The free end of the contact arm $r_0$ will take the position $A_2B$ and the long arm $R_0$ will take the position $BC_2$. Such a change of elevation may be assumed as having been caused by the thermal expansion of test specimen 15 or such other circumstances as may cause a vertical translation of the point of contact 21 of the rod 13.

Applying the general formula to these specific conditions we have $$s_2 = r_2(1 - \cos \alpha_2) \quad \quad \quad (3)$$

where $s_2$ is the sagitta of an arc $A_2A_0a$,
$r_2$ is the length of contact arm, and
$\alpha_2$ is the angle $A_2BA_0$.

The angle $A_2BA_0$ or $\alpha_2$ is equal to angle $C_0BC_2$ which may be read off the scale 23. Since $r_0$, $r_1$, and $r_2$ is the same in all instances or a constant $r$, the distance T, which is the translation from position 19 to position 20 is the difference between $s_2$ and $s_1$ or $$s_2 - s_1 = T = r(1 - \cos \alpha_2) - r(1 - \cos \alpha_1)$$
$$T = r(\cos \alpha_1 - \cos \alpha_2) \quad \quad \quad (4)$$

Analysis of the foregoing formulae will show that for small angles of inclination of the contact arm, the ratio of the arc to its corresponding sagitta is very large. Thus, for instance, if $\alpha = 5°$, the ratio $$\frac{\text{arc}}{\text{sagitta}}$$

would be equal to 114. Assuming that the recording arm (a constant R) is five times longer than the contacting or sliding arm $r$, the arc indicated on the scale 23 will in this case be $114 \times 5 = 570$ times greater than the sagitta $s$ when inclination angle $\alpha$ is 5°.

It will now be apparent that vertical translation of the surface of the plate 12 may be read indirectly on the scale as an arc of highly magnified length. Consequently even very small translations can be registered on the scale.

To measure a translation of the surface of plate 12 and accordingly, any translation due to the test specimen, two readings should be taken off the scale, one before and one after the movement, which will give the initial and final values of inclination angle, $\alpha_1$ and $\alpha_2$. From these values translation may be determined by the formula $$(T = r_1(\cos \alpha_1 - \cos \alpha_2) \quad \quad \quad (5)$$

It will be understood that in actual practice tables previously calculated for specific embodiments of the invention may be prepared and used to facilitate determinations.

The scale 23 may, for example, be divided into twentieth parts of a millimeter in which case the accuracy of reading with the naked eye will be at least half a millimeter. By the use of a magnifying glass having power 20, one fortieth of a millimeter or 25 microns may be read off the scale. Assuming that the sliding arm $r$ is 50 mm. long and that the recording arm R is five times longer, it is possible to read off the scale an angle equivalent to 20.6″, since this angle under these conditions will correspond to 25 microns on the scale 23. Calculations in accordance with the formulae herein derived will show that if the initial inclination angle $\alpha$, is 5°, a change of recording arm R of 20.6″ on the scale 23 would correspond to a vertical translation T of 0.5 micron.

This value, however, is not the smallest translation that may be recorded, since the degree of magnification with which the record is being taken varies with the value of the initial inclination angle, $\alpha_1$. If the lever is set to give an initial inclination angle of less than 5°, the minimum translation that can be determined will be correspondingly less. Consequently, the degree of precision in the measurement of translation will vary according to the initial setting of the instrument.

In some instances it will be preferable in physical embodiments of the invention to provide the free end of the contact arm with a very sharp and hard contact member. In other instances a round or spherical surface should be employed as a contact member.

If, for example, the instrument is designed for recording reverse vertical movements at small inclination angles, it may happen that a sharp contacting edge or point would be pressed into the plate instead of sliding over it, due to the small inclination angle or for other reasons. To avoid this, the sliding arm at its free end may be provided with a rounded contact member.

Assuming that the free end of the sliding arm is provided with a spherical surface as shown diagrammatically in Fig. 2, the circle 22 may represent a spherical surface, exaggerated to facilitate description. The point of contact with the surface 18, of the plate 12 is represented at O. The point of contact O is not on the same line as the base line $r_4$ through the center $c$ of the sphere 22; $r_4$ in Fig. 2 corresponds to $r_0$, $r_1$ and $r_2$ in Fig. 1. OB will represent the line from the contact point O to the pivot B. This point of contact O will be shifted on the spherical surface 22 with every change of inclination angle $\alpha$ and the value of inclination angle $cBD$ (Fig. 2) when recorded on the scale 23 will always be greater than its real value OBD. Consequently, a translation calculated from the recorded angle on scale 23 will also be greater than the real one. The correction or difference $d$, however, can be accurately determined.

As may be deduced from Fig. 2, the difference ($d$) is equal to the sagitta of arc EOF or $$d = \rho(1 - \cos \alpha) \quad \text{_____}(6)$$

where $\rho$ is the radius of the sphere 22, and
$\alpha$ is the inclination angle $cBD = EcO$.

Therefore, when using a sliding arm with a spherical end member for contacting the surface 18 of the plate 12, the result calculated from the value of inclination angle read off the scale 23 should be corrected accordingly.

In actual practice the correction or real value of vertical translation may be taken from a previously prepared table in which value of T may be calculated from the formula:

$$T = (r - \rho)(\cos \alpha_1 - \cos \alpha_2 \text{_____}(7)$$

where $r$ is the distance from the pivot through the center of the sphere to the opposite surface of the sphere,
$\rho$ is the radius of the sphere,
$\alpha_1$ is initial inclination angle read off the scale,
$\alpha_2$ is final inclination angle read off the scale.

In some instances it may be desirable to use a miniature cylindrical roller in place of the sphere to reduce friction but it will be apparent that the same formulae may be applied.

Having described a method of practicing the invention, certain specific embodiments to illustrate various means to carry out the method will be described although it will be possible to design other apparatus to practice the method in accordance with the invention.

The apparatus disclosed in Fig. 3 and Fig. 4 represents a gauge which may be used for measuring the thickness of thin sheets and coatings. It comprises a lever 30 pivoted at 31 on a vertical plate 32 which in turn is mounted on a horizontal base plate 33.

The lever 30 comprises an indicating arm 34 and a sliding arm 35. The lever is mounted on a pivot axle 36 mounted in bearings 37 and 38; the former fixed to the vertical plate 32 and the latter in a bracket 39 also fixed to the vertical plate 32.

The free end of the indicating arm 34 is provided with a pointer 40 and the free end of the sliding arm is provided with a pointed contact member 41. It will be understood that a line drawn through the pointer 40, the pivot 31 of the pivot axle 36 and the point 42 of contact member 41 forms a right angle although in some embodiments of the invention the lever may have other shapes.

An adjustable counter-weight 43 is mounted on a threaded rod 44 fixed to the lever 30 and may be adjusted for counter-balancing the lever for delicate operation of the instrument.

Also fixed to the bracket 39 is a post 45 upon which is mounted at one end for movement thereabout, an arm 46 the opposite end of which carries a magnifying glass 47. A nut 48 threaded on post 45 may be adjusted to clamp the arm 46 to the post 45 so that it may be held in temporarily fixed, yet movable, position and may be moved independently of the lever 30.

Mounted on the vertical plate 32 and positioned back of the pointer 40 and the magnifying glass 47 is an arcuate graduated scale plate 49 provided with a scale 23.

The vertical plate 32 is cut away as shown at 50 to provide a space for movement of test specimens beneath the contact member 41. Such a test specimen 51 may be placed on the base plate 33 and moved thereon as desired.

Sliding arm 35 may lean against the base plate 33 with the contact member 41 in contact therewith and may be so adjusted that there is a small inclination angle to the vertical with the base plate maintained in horizontal position.

To determine the thickness of specimen 51 the inclination angle of the sliding arm may be read on the scale 23, the magnifying glass 47 being used to facilitate accurate reading. The sheet 51, the thickness of which is to be determined, may then be moved toward the contact member 41 of the sliding arm 35 until the contact member "steps on" the specimen 51. The increase of the inclination angle of the sliding arm 35 caused by the elevation of the contact end 42 may then be read off the scale since the indicating arm will follow the movement of the sliding arm. Such adjustment of the magnifying glass as may be necessary to facilitate reading may be readily made. The thickness of the sheet 51 may then be determined by the Formula 5 or may, as hereinbefore described, be taken directly from tables previously prepared.

It will be apparent that the same procedure may be quickly and easily followed for various points or areas; or on continuous lines over the surface of the sheet, if desired. For example, by means of the invention thickness of sheets, strips and any rolled material can be continuously controlled during the rolling process.

Thickness of coatings may be determined in accordance with the previous description if a part of the coating may be removed from the base material. It is common practice to remove the coatings over limited areas by mechanical means or chemical reagents. Then the specimen may be moved on the base plate until sliding arm contact member has passed over a step from the coating surface to the uncoated surface or vice versa and the change in inclination angle noted from which the thickness of the coating may be determined.

When a lever gauge constructed in accordance with the invention is to be used for recording volume changes in solid bodies its construction may, for example, follow a design such as disclosed in Fig. 5. The sliding arm may lean against the surface 18 of a contact plate 12 fixed on a rod 13 which is slidably mounted in a frame 16 fixed to the base plate 33a by a bracket 52. The frame 16 provides a bearing in which the rod may fit and slide vertically. The base plate 33a may be mounted on a plurality of legs 53, one only of which is shown. Screws 54 may be used for levelling the base plate 33a. The specimen 15 may be placed on a level, adjusting table 55 which is provided with levelling and elevating adjusting screws 56. The procedure hereinbefore described may be followed in determination of expansion or contraction of the specimen.

In instruments intended for measuring expansion and contraction of liquids or gases, the gauge may function in conjunction with piston 60 as shown in Fig. 6. The piston may fit snugly into cylinder 61 comprising the neck of a container 62. A rod 13a fixed to contact plate 12a may slide through a bearing 16a. The expansion or contraction of the liquid 63 will cause tranlation of the piston 60 and accordingly may be registered through plate 12a and lever 30 represented diagrammatically and mounted on a pivot 31a.

In some instances the surfaces of specimens to be tested are not readily accessible; for example, inner surfaces of tubes or dies. In such cases a modified form of gauge may be used. Such a modification may comprise a contact plate 12b (see Fig. 7) upon which may rest the lever 30b shown diagrammatically but corresponding to lever 30. The plate may be fixed to a rod 13b mounted for movement in a bearing frame 16b. The opposite end 64 of the rod 13b may be attached to a lever 65 pivoted at 66. The opposite end of the lever may carry a stylus 67. The latter may be placed on the inner surface of the specimen as indicated in Fig. 7. Thus the inner surface conditions of the tube 68 may be translated through the lever 65 and rod 13b to plate 12b and recorded by the lever 30b as previously described.

An apparatus constructed in accordance with the invention may also be employed for registering fine details on plane or round surfaces, in such instances, for example, when smoothness of finely machined and polished surfaces must be controlled. Further, it may be used in conjunction with planimeters for automatic determination of total area of depressions and elevations on certain surfaces. The purpose and method of planimetric determinations are described in my paper entitled "Determination of Structural Compositions of Alloys by a Metallographic Planimeter", Trans. A. I. M. E., 1925. Therein a method is described whereby an alloy surface is prepared to present light and dark areas under the microscope. When applying the present method and apparatus the specimen will be prepared by deep etching whereby to present raised areas and areas of depression.

The modification shown in Fig. 10 has no contact plate. Vertical translation of the rod 13c slidably mounted in a bearing frame 16c, which may correspond to rod 13, is transferred to a lever 70 pivoted at 71 to the rod 13c and pivoted to the free end of the arm 35c corresponding to the sliding arm 35 of the lever 30 in Fig. 3. Translation of the specimen is transmitted through rod 13c moving through frame 16c in the same manner as hereinbefore described and then to connecting rod 70 which rotates angular lever 30c about its axis 31c. This connecting rod 70 exercises a restraining action on the movement of the angular lever 30c similar to that of the contact plate 12 and the lever 30c functions in like manner as previously stated. Pivoted joint 72 has the same relative movement as the sliding contact member 42 on the contact plate 12 but the mathematical relation of an arc to corresponding translation of the specimen is different.

If connecting rod 70 has a length equal to the length of sliding arm 35c this relation may be expressed:

$$t = 2r(\cos \alpha_1 - \cos \alpha_2) \quad \text{(8)}$$

where $t$ is translation of the specimen,
$r$ is the length of sliding arm,
$\alpha_1$ is the initial inclination angle, and
$\alpha_2$ is the final inclination angle.

In some instances it may be preferable to use double levers, particularly where greater precision is desired. Such apparatus may take the form disclosed in Fig. 8 and Fig. 9. A primary lever 30d, corresponding substantially with lever 30 of Fig. 3, may be pivotally mounted on a bracket 39d fixed to a vertical standard 32d, which in turn may be mounted on a base 33d. A primary contact plate 12d is fixed to rod 13d which may be slidably mounted in a frame 16d fixed to standard 32d.

Positioned above the free end 80 of the longer arm of the primary lever 30d is a plate fixed to a rod 13e slidably mounted in a frame 16e fixed to the standard 32d. Fixed to uppermost end of the rod 13e is a secondary contact plate 12e. Mounted above this secondary contact plate is a secondary lever 30e substantially corresponding to lever 30. It is pivotally mounted in a bracket 39e fixed to the standard 32d. An arcuate scale 49e corresponding substantially with scale 49 is also mounted on the standard.

It will be observed that vertical translations of plate 12d will cause a relatively corresponding movement of primary lever 30d as described in connection with the apparatus disclosed in Fig. 3. The movement of the free end 80 of this lever will be transmitted through rod 13e and plate 12e causing a relatively corresponding movement of the secondary lever 30e. Thus any vertical translation of the surface 14 of specimen 15 (Fig. 8) may be transmitted to the secondary lever 30e with consequent greater magnification than when only one lever is utilized.

Vertical translation of plate 12e may be determined from formula:

$$t = R(\sin \alpha_1 - \sin \alpha_0) \quad \text{(9)}$$

where $t$ is translation,
R is the length of recording arm of the primary lever,
$\alpha_0$ is the value of inclination angle $\alpha$ before translation, and
$\alpha_1$ is the value of inclination angle $\alpha$ after translation.

It will be understood that in actual practice the value of $t$ may be taken from a previously prepared table.

From the foregoing description it will be seen that the invention provides a method and apparatus admirably adapted for fine and sensitive measurement of small translations. Whereas the mechanism of common micrometers heretofore used combines translation with rotary movement in a plane perpendicular to the direction of translation, a micrometer gauge constructed in accordance with this invention provides for both translatory and rotary movements in the same or parallel planes. This feature is very desirable since it facilitates transmission of one form of movement into another form. Thus, for instance, when expansion of solids is measured, a small force of expansion can easily raise the free end of the counter-balanced angular lever, while it would be difficult for it to rotate a screw, such as embodied in the common form of micrometer gauge. For this reason, the angular lever gauge provided by this invention may be applied to a large number of uses to which the screw micrometer is not adapted.

I believe the invention to be broadly new. It is founded on the geometric relation between the arc and its sagitta which in small angles has an extremely high ratio. Furthermore, when translation is converted into rotary motion, it may be registered on a scale as an arc of greatly magnified length.

As magnification depends on the initial inclination angle, the degree of precision of the same gauge may be varied by the setting of the initial inclination angle. Therefore, the same instrument may be used for measurements on large or small scales.

While certain novel features of the invention have been disclosed and are pointed out in the annexed claims, it will be understood that various omissions, substitutions and changes may be made by those skilled in the art without departing from the spirit of the invention.

It will be understood further that the term "vertical" is not intended to be restricted in the following claims to an up and down direction as the apparatus is not necessarily confined to determination of translation in an up and down direction since the base of the apparatus may be used in different planes. The terms "vertical" and "horizontal", therefore, are intended to be construed in a relative sense.

What is claimed is:

1. A device of the character described for measuring translations of micrometric dimensions comprising a base, a standard mounted on said base, an angular lever having an indicating arm, a contact arm and a pivot axle transverse of said lever positioned at the vertex of said angular lever pivotally mounted on said standard for rotatable movement of said lever about the pivot in a plane perpendicular to the plane of said base, means mounted on said lever for accurate positioning of said contact arm at a predetermined angle of inclination and adapted to regulate the resulting component forces to balance said lever, and a scale mounted on said device adjacent the free end of said indicating arm positioned and graduated to measure the movement of the free end of said indicating arm to the nearest half millimeter when observed by a naked eye, said indicating arm being of sufficient length to move its free end about the pivot through an arc of at least twenty-five microns, when the component displacement of the free end of said contact arm in a direction perpendicular to the plane of said base is no greater than one-half micron when said contact arm is set initially at an inclination angle of approximately five degrees.

2. A device of the character described for measuring translations of micrometric dimensions comprising a base, a standard mounted on said base and extending outwardly therefrom at substantially right angles, a right angle lever, having an indicating arm, a contact arm and a pivot arm transverse of said lever positioned at the vertex of said right angle lever, pivotally mounted on said standard for swingable movement of said lever about the pivot in a plane perpendicular to the plane of said base, means including an adjustable counter-poise mounted on said indicating arm adapted to regulate the resulting component forces of the pivoted lever to urge the free end of the contact arm to move gently in an arc about said pivot and to accurately adjust the angle of inclination of said contact arm, a scale mounted on said device adjacent the free end of said indicating arm positioned and graduated to measure the movement of the free end of said indicating arm to the nearest half millimeter when the movement is observed by the naked eye, said indicating arm being at least five times longer than said contact arm and having a length relative to said contact arm such that when said contact arm is set at an inclination angle of 5°, a movement of the free end of said indicating arm of twenty five microns will effect a movement of the free end of said contact arm in a direction perpendicular to the plane of said base of no more than 0.5 micron.

3. A device of the character described for measuring translations of micrometric dimensions comprising a base plate having a smooth and level surface, a standard fixed to said base plate and extending outwardly therefrom at substantially right angles, a bracket mounted on said standard, a right angle lever having an indicating arm, a sliding arm and a pivot axle transverse of said lever positioned at the vertex of said right angle lever, said pivot axle being suspended in said bracket for swingable movement of said lever about the pivot, a contact member fixed to the free end of said sliding arm having a spherical surface adapted for easy sliding movement over the surface of a test specimen, an adjustable counterbalance opposite said indicating arm adapted to regulate the resulting component forces of the pivoted lever to urge the spherical surface of the sliding arm contact member to move gently over the surface of a test specimen in an arc about said pivot, a graduated scale mounted on said device adjacent the free end of said indicating arm to indicate the component displacement of the free end of said sliding arm in a direction perpendicular to the plane of said base plate as a function of the movement of the free end of said indicating arm along said scale.

4. A device of the character described for measuring translations of micrometric dimensions comprising a base, a standard fixed to said base and extending outwardly therefrom at substantially right angles, an angular lever having an indicating arm, a sliding arm and a pivot axle transverse of said lever positioned at the vertex of said angular lever, said pivot axle being mounted on said standard for swingable movement of said lever about the pivot in a plane parallel with the plane of said standard, an adjustable counterbalance opposite said indicating arm adapted to regulate the resulting component forces of the pivoted lever to urge the free end of the sliding arm to move gently in an arc about said pivot, a spherical contact member affixed to the free end of said sliding arm and a graduated scale mounted on said device adjacent the free end of said indicating arm to measure the arcuate movement of the free end of said indicating arm along said scale as a function of the component displacement of said contact member in a direction perpendicular to the plane of said base.

5. A device of the character described for measuring translations of micrometric dimensions comprising a base plate, a standard fixed to said base plate and extending outwardly therefrom at substantially right angles, a right angle lever having an indicating arm, a contact arm and a pivot axle transverse of said lever positioned at the vertex of said right angle lever, said pivot axle being mounted on said standard for swingable movement of said lever about the pivot, means defining an opening in said base plate beneath said pivot, a contact plate having a smooth level surface mounted for vertical movement in said opening, means mounted on said lever adapted to regulate the resulting component forces of the pivoted lever to urge the free end of the contact arm to move gently in an arc about said pivot and to slide along the surface of said contact plate when said contact plate is moved vertically and a graduated scale mounted on said device adjacent the free end of said indicating arm to indicate the movement of the free end of said indicating arm along said scale as a function of the component displacement of the free end of said contact arm in a direction perpendicular to the surface of said contact plate when said lever is actuated by said contact plate.

EUGENE P. POLUSHKIN.